(12) United States Patent
Najm

(10) Patent No.: US 6,632,269 B1
(45) Date of Patent: Oct. 14, 2003

(54) FURNACE FILTER ASSEMBLY

(76) Inventor: Joseph L. Najm, 19892 Shennandoah Ridge, Strongsville, OH (US) 44136

( * ) Notice: Subject to any disclaimer, the term of this patent is extended or adjusted under 35 U.S.C. 154(b) by 18 days.

(21) Appl. No.: 09/823,226

(22) Filed: Apr. 2, 2001

(51) Int. Cl.$^7$ .................. B01D 46/18; B01D 46/46
(52) U.S. Cl. .................. 95/273; 95/19; 95/26; 95/277; 96/421; 96/423; 96/429; 55/351; 55/352; 55/354; 55/422; 55/495; 55/501; 55/506; 55/481
(58) Field of Search .................. 55/351, 352, 354, 55/422, 495, 497, 498, 499, 500, 501, 506, 481; 96/421, 423, 429; 95/19, 26, 273, 277; 206/223

(56) References Cited

U.S. PATENT DOCUMENTS

| | | | |
|---|---|---|---|
| 1,982,639 A | | 12/1934 | Christofferson |
| 3,286,443 A | | 11/1966 | Wooldridge |
| 3,368,333 A | | 2/1968 | Merklin |
| 3,552,098 A | | 1/1971 | Cochran |
| 3,552,101 A | | 1/1971 | Papp |
| 3,774,373 A | | 11/1973 | Welch et al. |
| 3,783,588 A | * | 1/1974 | Hudis .................. 55/354 |
| 3,912,632 A | | 10/1975 | Winzen |
| 4,174,205 A | | 11/1979 | Koushiafes |
| 4,221,576 A | * | 9/1980 | Phillips, Jr. .................. 55/352 |
| 4,229,187 A | * | 10/1980 | Stockford et al. .................. 55/354 |
| 4,359,388 A | | 11/1982 | Nordenskjold |
| 4,470,833 A | | 9/1984 | Wolfe |
| 4,521,230 A | | 6/1985 | Strong |
| 4,894,071 A | | 1/1990 | Klein |
| 5,411,579 A | | 5/1995 | Benton et al. |
| 5,427,325 A | | 6/1995 | Weaver |
| 5,529,593 A | | 6/1996 | Simmons |
| 5,599,363 A | * | 2/1997 | Percy .................. 55/352 |
| 6,152,998 A | * | 11/2000 | Taylor .................. 55/354 |
| 6,168,646 B1 | | 1/2001 | Craig et al. |
| 6,402,822 B1 | * | 6/2002 | Najm .................. 55/351 |
| 6,491,735 B2 | * | 12/2002 | Najm .................. 55/351 |

OTHER PUBLICATIONS

Sales brochure by AutoRolls, entitled Auto Line Automatic Air Filtration; no publication date or additional information available.

* cited by examiner

Primary Examiner—Duane Smith
Assistant Examiner—Jason M. Greene
(74) Attorney, Agent, or Firm—Fay, Sharpe, Fagan, Minnich & McKee

(57) ABSTRACT

A furnace filter assembly for removing dirt and contamination from air entering an existing furnace is installable on the existing furnace without the need for modification thereof, and includes a filter frame, a supply roll for supporting a continuous length of bulk filter media, a take-up roll for receiving the filter media as it is advanced from the supply roll across the filter frame, a motor for rotating the take-up roll for advancing the filter media, all of which components are mounted on the filter frame. The assembly further includes a motor control system having a pressure sensor, a timer, and a switch in electrical communication with a controller for energizing and de-enegizing the motor in response to conditions of the filter media.

38 Claims, 10 Drawing Sheets

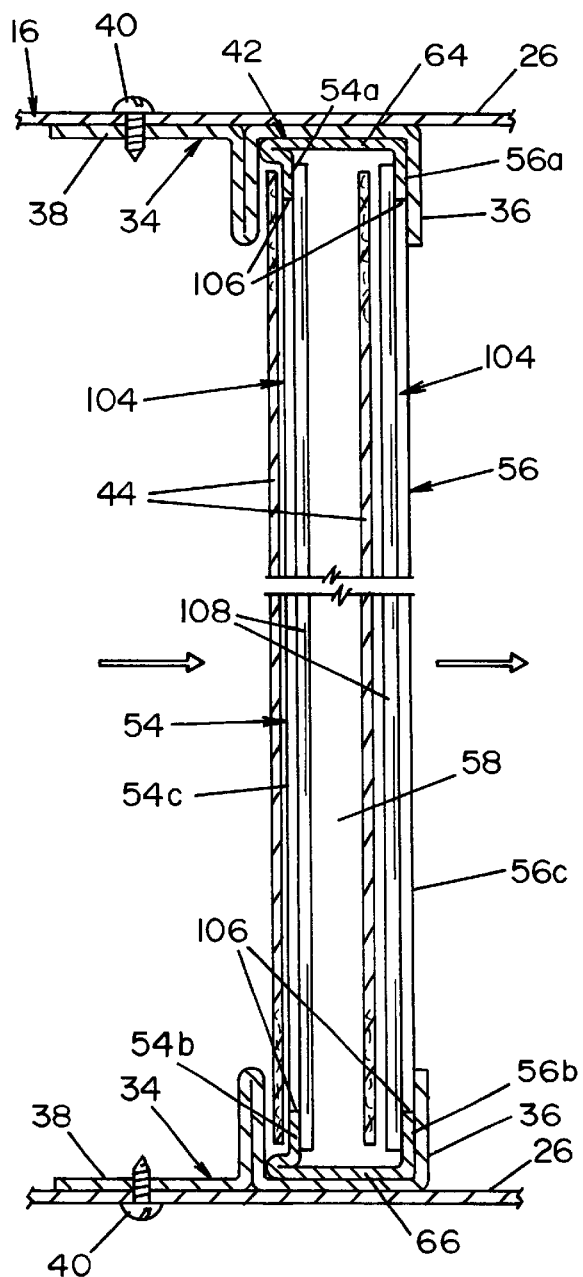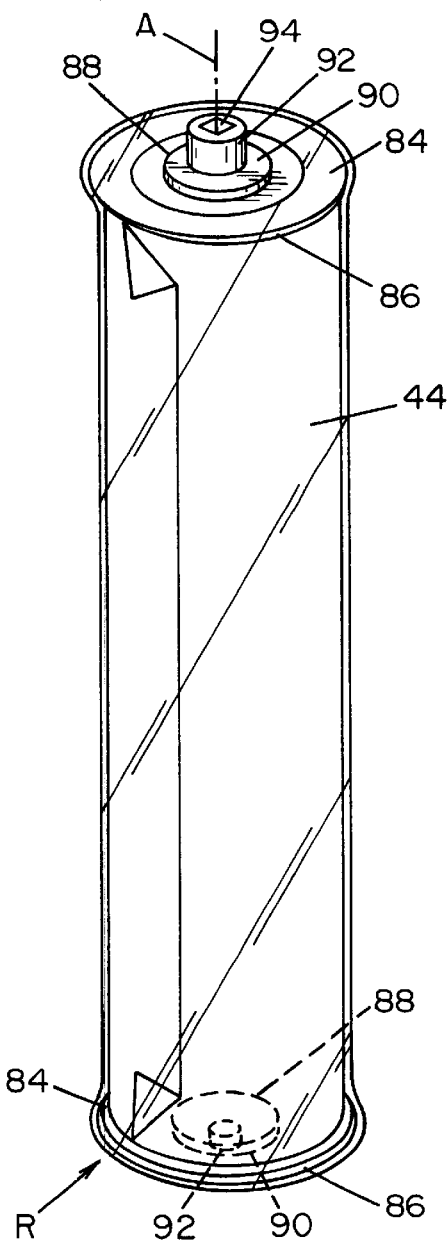
FIG. 8
FIG. 9

FURNACE FILTER ASSEMBLY

INCORPORATION BY REFERENCE

Koushiafes, U.S. Pat. No. 4,174,205; Strong, U.S. Pat. No. 4,521,230; and Najm, U.S. Pat. No. 6,402,822 are incorporated herein by reference for background information.

The subject invention relates to the art of furnace filters, and more particularly to furnace filter assemblies that include a continuous length of advanceable filter media instead of individual replacement filter cartridges.

BACKGROUND OF THE INVENTION

Furnace filter assemblies have been provided heretofore, and generally, as shown in Koushiafes for example, have a filter frame which can be installed on an existing furnace in place of the standard filter cartridges normally installed thereon. Such assemblies include a roll of filter material that is adjacent one end of the filter frame and which extends through the frame to the opposite end. As can be best seen in FIGS. 1 and 2 of Koushiafes, the opposite end of the filter frame includes a knife edge which is used to remove filter material that has been manually pulled through the filter frame. Furnace filter assemblies such as that in Koushiafes require a person to install the filter frame on the furnace, thread the filter material through the frame, and then continually monitor the condition of the filter material by removing the entire filter frame from the furnace and visually inspecting it. Based on these repeated visual inspections, it will eventually be determined that the filter material is dirty and clogged, and therefore needs to be replaced. To advance the filter material, it must be grasped by hand, pulled out of the frame exposing a new length of filter material, and pulled against the knife edge to tear or cut the used filter material away from the newly exposed filter material now extending across the filter frame. Such requirements create a variety of problems and difficulties. First, the filter material in Koushiafes must be repeatedly monitored the same way a traditional filter cartridge must be, to insure efficient and effective operation. As previously indicated such monitoring requires that the filter frame be removed from the furnace, visually inspected for dirt and clogging, and then replaced. This is a dirty and time-consuming process which, furthermore, is subjective. As such, the filter material may be advanced before it has become inefficient and ineffective thereby wasting filter material, or oppositely, the filter material may be advanced only after it has long become ineffective. Second, the process of advancing the filter material by hand, tearing it across the knife edge on the frame, and discarding it, is a dirty job which will cause dirt collected in the used filter material to be deposited on the hand or hands of the user, to be dislodged and fall onto the floor where it must be cleaned up or to fall onto the users clothing which thus becomes soiled.

Furthermore, devices such as the one disclosed in Strong create a different set of problems and difficulties. The device in Strong eliminates some of the monitoring and handling requirements of Koushiafes, by providing a cleaning apparatus which removes dirt and contaminants from an endless belt of filter material. However, the device in Strong is not easily installed on an existing furnace. There are a significant number of individual components that must be properly installed and aligned. This may require extensive modification to the furnace and can be further complicated by limited clearance in the area around the furnace and its attendant duct work. Accordingly, the device in Strong would be difficult to properly install and thus is both time-consuming and expensive.

Finally, devices such as the one disclosed in the co-pending application of Najm have many advantages. However, such devices include a significant number of individual components each requiring alignment and installation. In fact, a device in accordance with Najm has a filter frame inserted into the interior of a duct and secured in place by fasteners. The filter frame fits into the duct through opposing slots that, most often, have to be cut into the duct work by the installer. Once the slots are cut and the filter frame inserted and fastened into place, a top and a bottom roller support has to be individually installed on the exterior of the duct with one each of the top and the bottom supports being adjacent each slot. The top and bottom supports must be carefully aligned with one another to rotatably support a filter cartridge therebetween. The filter cartridges are adapted to store and to receive a bulk roll of filter media, and must rotate freely between the top and bottom supports on each side of the duct to function without tearing the filter media extending between the cartridges. It will be appreciated that such a system may provide many advantages, but that such a system is also very difficult and time-consuming to install and, accordingly, undesirably expensive.

SUMMARY OF THE INVENTION

In accordance with the present invention, a furnace filter assembly is provided for installation on an existing furnace which avoids or minimizes the problems and difficulties encountered with devices of the foregoing character, while promoting and maintaining the desired simplicity of structure, economy of manufacture, and ease and thus economy of installation and operation. More particularly in this respect, a furnace filter according to the invention includes a filter frame that can be quickly and easily removably mounted on an existing furnace for supporting a supply roll used to store an unused filter media that is rotatably mounted on the filter frame, a take-up roll for receiving used filter media, a motor driveably connected to the take-up roll, and a control system for energizing the motor and thereby advancing the filter media from the supply roll to the take-up roll. Each of these components is supported by the filter frame. As a result, the entire furnace filter assembly is supported by the filter frame which is in turn removably installed on and supported by the furnace itself. Accordingly, the entire furnace filter assembly can be installed without the need for major modification of the existing furnace as it is required by the previously discussed reference to Strong and with less time and effort then is required to install the system of Najm.

Furthermore, the provisions on the filter frame for mounting each of the foregoing components are adaptable to provide a variety of mounting arrangements. For example, the supply roll may be mounted on one end of the filter frame with the take-up roll being mounted on the opposite end, and the filter media making only one pass across the filter frame. Alternatively, the furnace filter assembly may be entirely installed and accessed from one side of the furnace, in which case both the supply roll and the take-up roll are mounted on the same end of the filter frame, with the filter media extending from the supply roll across the filter, frame to the opposite end and then returning across the filter frame to the take-up roll. In either case, the installation can be quickly and easily accomplished using common tools, and without major modifications to the furnace or duct work. Additionally, as will become apparent from the discussion hereinafter, the furnace filter assembly may provide three or more areas on one end of the filter frame for mounting the supply roll and the take-up roll. These two components will only utilize two of the three or more mounting areas. As a result, a determination can be made prior to installation as to which two mounting areas will be used, and the remaining mounting area or areas can be cut off or otherwise removed from the assembly. The ability to remove the unused mounting areas provides increased flexibility during installation of the furnace filter assembly onto an existing furnace or duct work, particularly in situations where there is limited clearance around the furnace or duct work. This provides increased versatility for mounting the furnace filter assembly relative to earlier devices.

It is accordingly an outstanding object of the present invention to provide a furnace filter assembly for installation on an existing furnace, the furnace filter assembly comprising a filter frame removably mountable on a furnace and carrying supply and take-up supports for a continuous length of filter media stored on a supply roll for extending through the filter frame to a take-up roll onto which the filter media can be advanced to periodically replace contaminated filter media with clean filter media.

Another object is the provision of a furnace filter assembly of the foregoing character in which all of the component parts are supported by a filter frame so that the furnace filter assembly can be installed on an existing furnace with little or no modifications to the furnace or its attendant duct work.

Still another object is the provision of a furnace filter assembly of the foregoing character which is adapted to be installed in any one of a variety of configurations to accommodate space or access limitations with respect to an existing furnace and its attendant duct work.

Still another object is the provision of a furnace filter assembly of the foregoing character which can be provided in the form of a kit that is easily assembled and requires only a minimal number of common tools for the assembly and installation thereof.

A further object is the provision of a furnace filter assembly of the foregoing nature which is comprised of a minimum number of parts and is structurally simple, thereby promoting the economic production and ease of installation of the furnace filter assembly.

BRIEF DESCRIPTION OF THE DRAWINGS

The foregoing objects, and others, will in part be obvious and in part pointed more fully hereinafter in conjunction with a written description of preferred embodiments of the invention illustrated in the accompanying drawings in which:

FIG. 8 is a cross-sectional elevation view of the furnace filter assembly taken along line 8—8 in FIG. 2;

FIG. 9 is a perspective view of a supply or take-up roll support including a roll of filter media;

DESCRIPTION OF PREFERRED EMBODIMENTS

Figure 1:
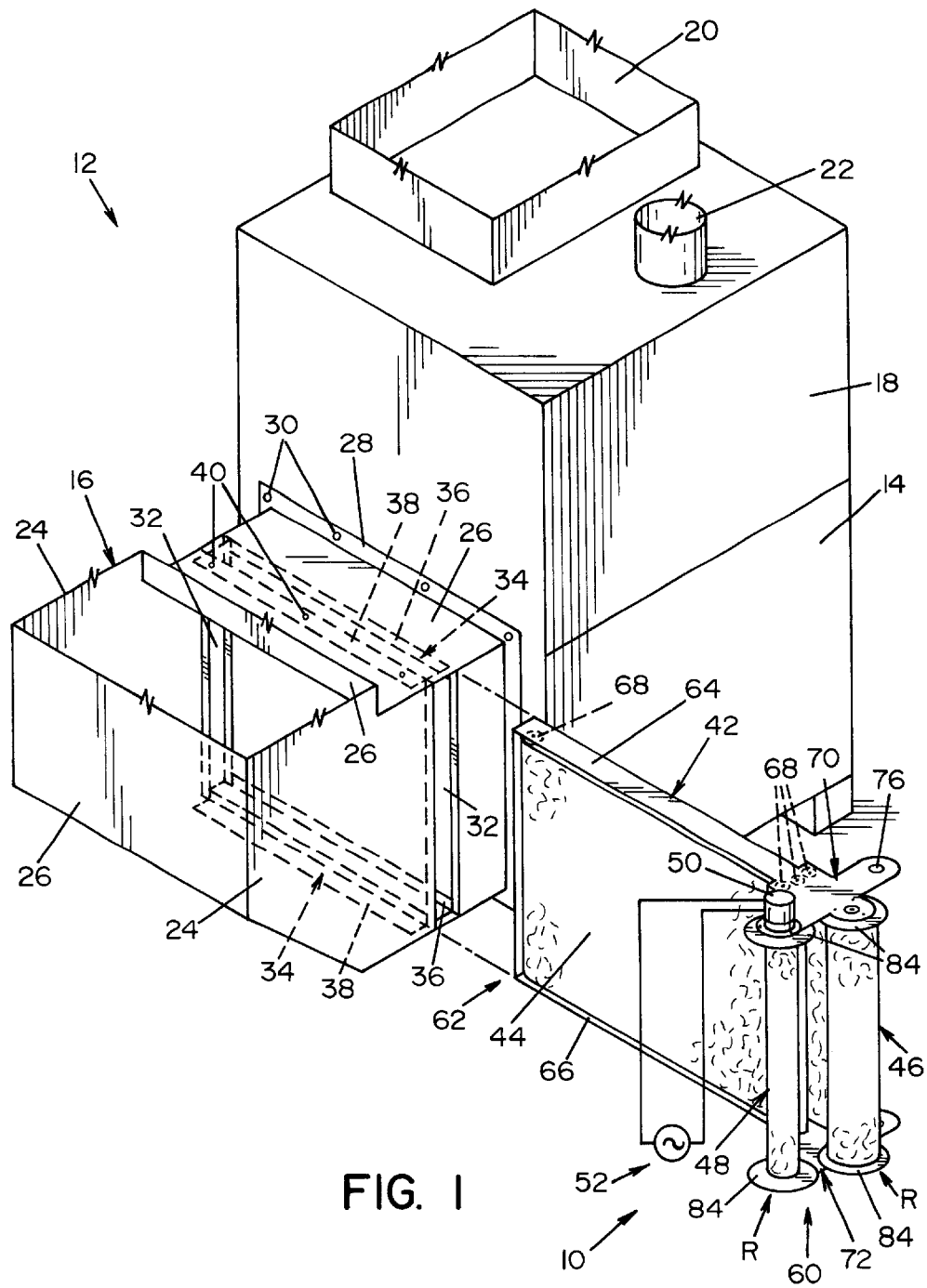
FIG. 1 is a perspective view of one embodiment of a furnace filter assembly in accordance with the present invention, and an existing furnace with its attendant duct work.

Referring now in greater detail to the drawings, wherein the showings are for the purpose of illustrating preferred embodiments of the invention only, and not for the purpose of limiting the invention, FIG. 1 of the drawing illustrates a furnace filter assembly 10 adjacent an existing furnace 12, and in position to be installed thereon. Furnace 12 has a cold air plenum 14 that receives incoming cold air from air intake duct 16, which is attached to and extends outwardly from plenum 14. Adjacent plenum 14 is furnace heat exchanger 18. Warm air plenum 20 and fume exhaust 22 are each attached to and extend outwardly from heat exchanger 18. Each of the foregoing components of furnace 12 are in fluid communication with the parts adjacent or attached thereto. Unfiltered air is drawn into air intake duct 16 and flows through the duct until it reaches plenum 14 into which the air is received. A fan (not shown) is located adjacent heat exchanger 18 and either forces or draws air from plenum 14 through heat exchanger 18 producing a warm air output. The warm air is forced out of heat exchanger 18 into plenum 20 from which the warm air can be distributed to remote vents. The heat in heat exchanger 18 is most commonly produced from the combustion of a fuel, such as natural gas, propane, coal, or fuel oil. Any fumes or gases remaining after combustion of the fuel are evacuated from heat exchanger 18 through exhaust 22. Alternatively, furnace 12 may use electricity to produce heat in heat exchanger 18, in which case exhaust 22 may not be provided. Generally, furnace filter assembly 10, is not affected by the type or configuration of furnace 12. In fact, as will be become apparent hereinafter, filter assembly 10 can be used with a wide variety of styles and configurations of furnaces. Furnaces of the foregoing character are generally well known, and therefore will not be further described hereinafter.

As best seen in FIGS. 1–4, air intake duct 16 is defined by a first pair of spaced apart walls 24 that generally extend vertically, and a second pair of spaced apart walls 26 extending therebetween and forming air intake duct 16 therewith. Generally, each pair of walls will be sheet metal, and will terminate at a flange 28 that is attached to plenum 14 by fasteners 30. Duct 16 has a pair of opposed filter slots 32 each extending through a corresponding one of walls 24 and in a generally vertical direction between walls 26. As best seen in FIGS. 8, a filter support track 34 is attached to each of the walls 26 inside duct 16 by fasteners 40, and each filter support track 34 extends transversely across duct 16 between filter slots 32. Filter support tracks 34 have a filter support portion 36 and a track mounting portion 38. The foregoing component parts and features of air intake duct 16 are generally part of an existing furnace 12, and would be used therein to house and support a traditional filter cartridge. Filter cartridges are generally well known and are commonly available in a variety of sizes and configurations. Filter slots 32 and filter support tracks 34 would be suitable to slidably receive and support one of such filter cartridges. It is the intention of the present invention with such an existing furnace.that furnace filter assembly 10 be a replacement for filter cartridges, whereby that furnace filter assembly 10 would be removably installable without the need for modification to the existing cartridge mounting provisions of furnace 12. Accordingly, furnace filter assembly 10 may be produced, as described hereinafter, in a variety of sizes conforming to established standards for furnaces and filter cartridges. At the same time it will be appreciated that the duct work of an existing furnace which is not provided with such slots and support tracks for a filter cartridge can be easily and quickly modified to provide these components to accommodate filter assembly 10.

In accordance with the present invention, the embodiment of furnace filter assembly 10 shown in FIGS. 1–6 and 8 is comprised of a filter frame 42, a filter media supply roll 46, a filter media take-up roll 48, a motor 50, and a motor control system 52. Supply roll 46 and take-up roll 48 are rotatably supported on filter frame 42. A continuous length of filter media 44 is provided in bulk coil form on a supply roll 46, and a portion of the continuous length of filter media 44 extends from supply roll 46 across filter frame 42 and then back to take-up roll 48 onto which it is wound. Filter media 44 is progressively wound onto take-up roll 48 until the entire length thereof is transferred from supply roll 46, at which point the resulting coil of used filter media can be removed and discarded, and a new bulk coil of filter media 44 can be installed on frame 42. Filter frame 42 is rectangular and has a front wall 54 including top and bottom portions 54a and 54b, respectively, and side portions 54c therebetween, and a back wall 56 spaced away from front wall 54 to provide a filter passage 58 therebetween. Back wall 56 includes top and bottom portions 56a and 56b, respectively, and side portions 56c therebetween. Filter frame 42 also has a top wall 64 and a bottom wall 66 respectively extending between and rigidly connecting top wall portions 54a and 56a and bottom wall portions 54b and 56b of front wall 54 and back wall 56. Filter frame 42 has a first end 60 and a second end 62 and includes at least one filter guide roller 68 at each end extending between and rotatably attached to top wall 64 and bottom wall 66. Extending outwardly and laterally at first end 60 of filter frame 42 are top roll mounting plate 70 and bottom roll mounting plate 72 respectively attached to top wall 64 and bottom wall 66 of the filter frame. Each of the roll mounting plates 70 and 72 include at least two, and preferably three, roll mounting areas 74 each having a roll mounting hole 76 for rotatably receiving a stub shaft 92 on the corresponding end of either supply roll 46 or take-up roll 48. Additionally, at least one, and preferably two of the roll mounting areas 74 of top mounting plate 70 provide motor mounting areas for mounting motor 50 on the filter frame. Each of the motor mounting areas has a plurality of motor mounting holes 80 arranged in a pattern about the corresponding roll mounting hole 76. Top mounting plate 70 and bottom mounting plate 72 are vertically aligned, and the corresponding roll mounting holes 76 therein are coaxial for receiving the stub shafts of either a supply roll 46 or a take-up roll 48.

Preferably, filter assembly 10 includes two identical rolls such as roll R show in FIG. 9, one acting as supply roll 46 and the other acting as take-up roll 48. As previously discussed, supply roll 46 will initially have a continuous length of filter media 44 wound thereon while take-up roll 48 will initially be empty. As can be best seen in FIGS. 5, 6 and 9, each of the rolls R has a cylindrical hub 82 having an axis A and terminating at each end in a radially outwardly extending circular end plate or flange 84. To assist filter media 44 in smoothly transferring on and off of the rolls R, the outside edges 86 of end plates 84 may be tapered or chamfered. Extending axially from each end plate 84 of each roll R coaxial with hub 82 is bearing boss 88 which includes bearing surface 90. Extending coaxially from each bearing boss 88 is a cylindrical stub shaft 92, and at least one of the stub shafts of each roll R has a non-circular drive recess 94 for driveably engaging with output shaft 102 of motor 50. Extending longitudinally along hub 82 of roll R is a slot 96 adapted to receive a leading or trailing edge of filter media 44. It can be appreciated that as an alternative to being received in slot 96, the leading or trailing edge of filter media 44 can be releasably attached to roll R in any number of other ways, including, for example, an elastomeric strap or a spring loaded wire bail extending along the hub.

Figure 5:
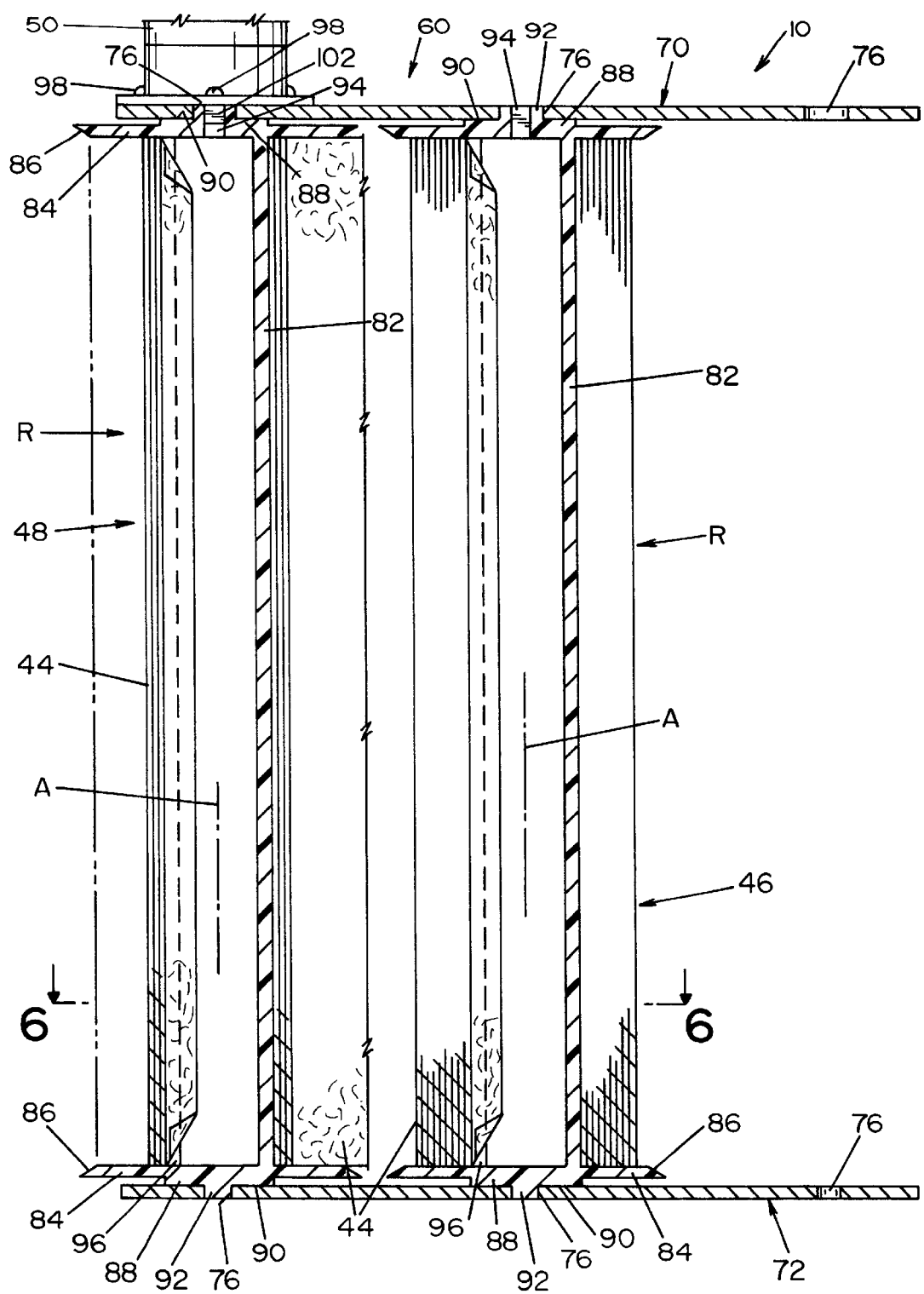
FIG. 5 is a cross-sectional elevation view for the supply and take-up rolls of the furnace filter assembly taken along line 5—5 in FIG. 2.
Figure 6:
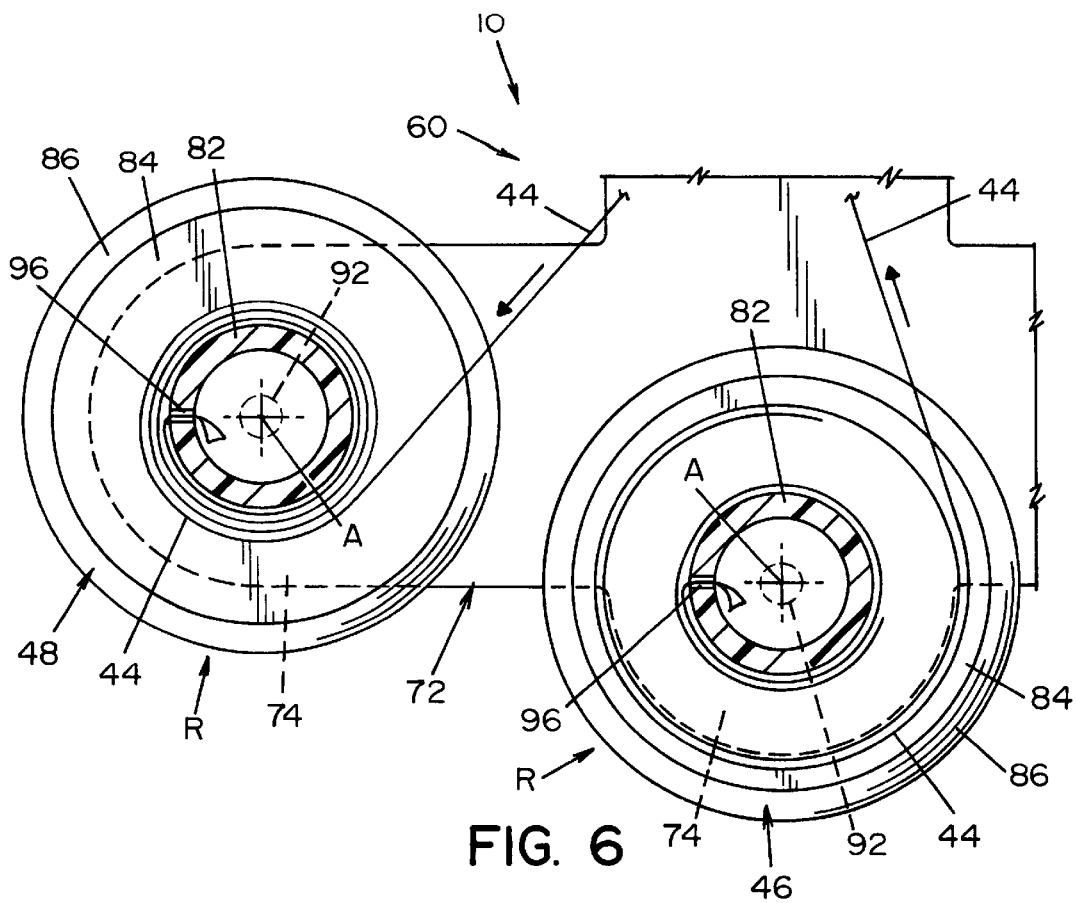
FIG. 6 is a cross-sectional view of the supply and take-up rolls of the furnace filter assembly taken along line 6—6 in FIG. 5.

As previously stated, supply roll 46 and take-up roll 48 are structurally identical. Accordingly, as shown in FIG. 5, the installation and interface of rolls R with top mounting plate 70 and bottom mounting plate 72 applies to both supply roll 46 and take-up roll 48. In this respect, rolls R extend vertically between top mounting plate 70 and bottom mounting plate 72 such that bearing surfaces 90 of bearing bosses 88 at the upper ends of rolls R underlie top mounting plate 70 and bearing surfaces 90 of the bearing bosses 88 at the lower ends of the rolls overlie and are supported on mounting plate 72. Stub shafts 92 of rolls R are received in roll mounting holes 76 of bottom mounting plate 72 and top mounting plate 70 with the shafts having non-circular recesses 94 therein being in the holes in the top plate. Accordingly, it will be appreciated that supply roll 46 its and take-up roll 48 are axially and rotatably supported between top mounting plate 70 and bottom mounting plate 72 by bearing surfaces 90, and are radially and rotatably supported by roll mounting holes 76 engaging shafts 92. However, it will be appreciated that a variety of suitable bearing arrangements may be used to rotatably support the rolls, including separate bearing plates, roller elements, and the like. As previously discussed, top mounting plate 70 includes at least one, and preferably two, motor mounting areas, and motor 50 is adapted to be attached to plate 70 in one such motor mounting area by fasteners 98 engaging in motor mounting holes 80 in plate 70. As shown in FIG. 5, output shaft 102 of motor 50 engages in drive recess 94 of take-up roll 48 to transmit rotational output from motor 50 to take-up roll 48 when the motor is energized. As previously indicated, supply roll 46 and take-up roll 48 are structurally identical. Accordingly, both supply roll 46 and take-up roll 48 include at least one drive recess 94 whereby, when the supply of filter media is depleted, the empty supply roll can be remounted to provide the take-up roll for the next supply of material. Additionally, it will be appreciated that bottom mounting plate 72 can likewise include at least one motor mounting area with motor mounting holes 80 such that motor 50 may be attached to bottom mounting plate 72 and driveably engage the lower end of a take-up roll 48

Figure 2:
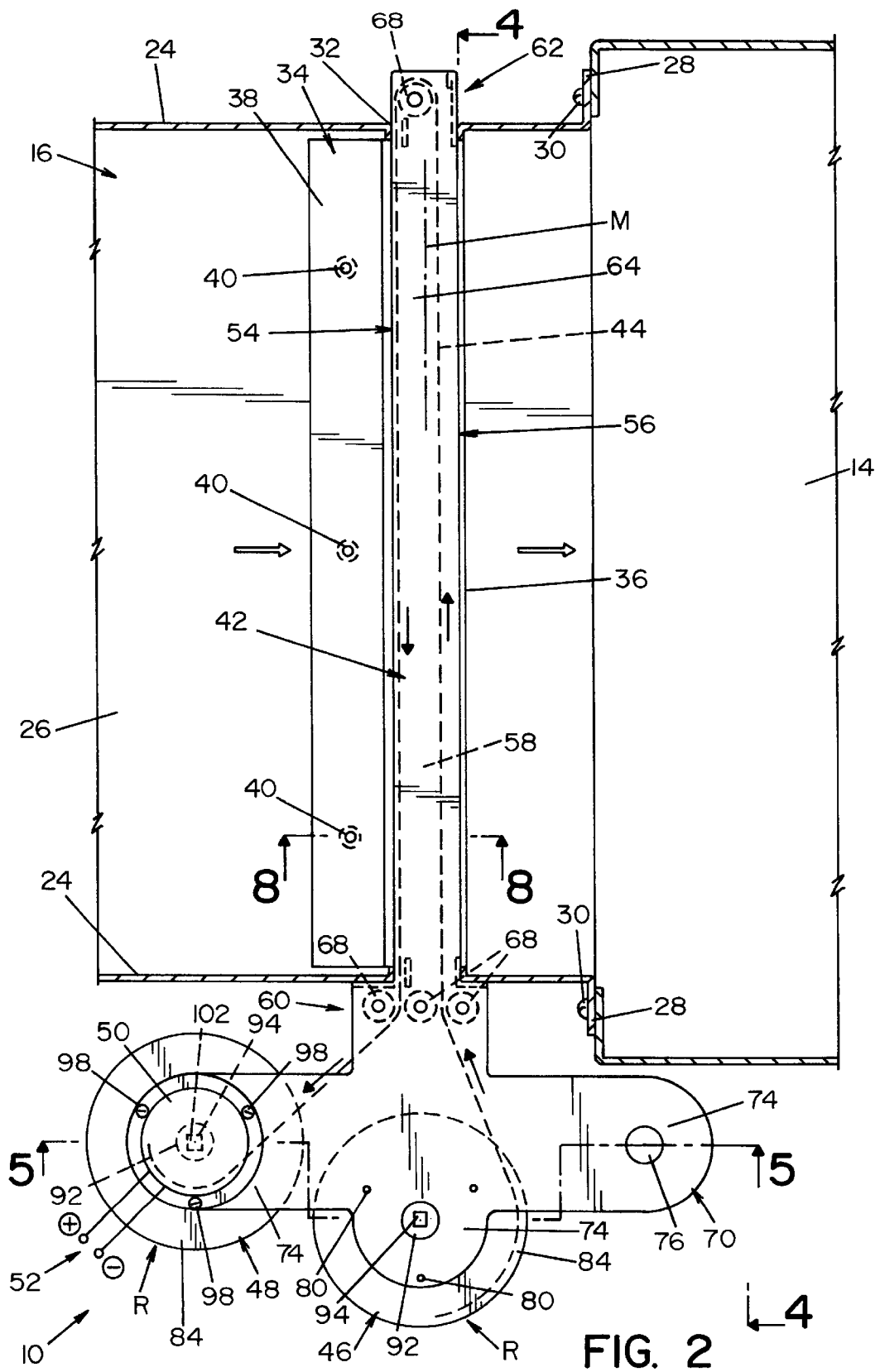
FIG. 2 is a plan view of the furnace filter assembly installed on the furnace shown in FIG. 1.
Figure 7:
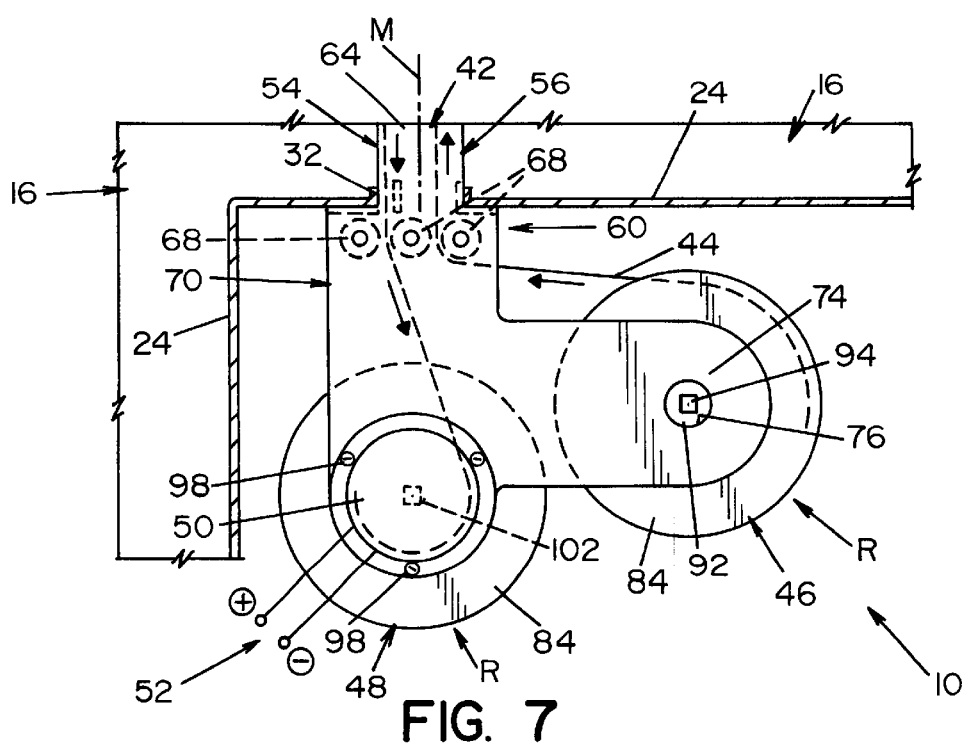
FIG. 7 is a partial top plan view of a right-hand installation of the furnace filter assembly.

In accordance with at least one object of the present invention, mounting plate 70 and mounting plate 72 each have at least two, and preferably three, roll mounting areas 74. Accordingly, supply roll 46 and take-up roll 48 can be installed in various ways utilizing different combinations of the three different mounting areas. This permits both the supply roll 46 and take-up roll 48 to be installed and accessed from one side of the furnace, and provides flexibility in installation should the furnace configuration require a "left-hand" assembly such as shown in FIGS. 1 and 2, or a "right-hand" assembly such as shown in FIG. 7. To provide such configurations, the unused roll mounting area 74 of the top and bottom roll mounting plates 70 and 72, respectively, can be cut off or otherwise removed to provide additional flexibility in assembling and installing furnace filter assembly 10, as shown in FIG. 7. It will be appreciated that filter frame 42 includes a midplane M parallel with front wall 54 and back wall 56. Midplane M is positioned midway between walls 54 and 56, and extends between first end 60 and second end 62. One of the roll mounting areas of mounting plate 70 and a corresponding roll mounting area of plate 72 are coaxially aligned with one another adjacent midplane M. The remaining coaxially aligned mounting areas are transversely spaced from midplane M such that one mounting area is upstream of the midplane and another mounting area is downstream of the midplane. Accordingly, FIGS. 1–3 and 6 show a "left-hand" configuration in which one of rolls 46 and 48 is adjacent midplane M, and the second of rolls 46 and 48 is to the left of midplane M. FIG. 7 shows a "right-hand" configuration in which the second of rolls 46 and 48 is to the right of midplane M. In an alternative embodiment, the top and bottom mounting plates, as manufactured, may include only two mounting areas, such as shown in FIG. 7, the first area being adjacent midplane M, and the second area being transversely spaced therefrom. Furthermore, the mounting plates can be detachably supported on the top wall and the bottom wall of the filter frame, respectively, as opposed to being integral therewith. As such, in this alternative embodiment, the mounting plates would be assembled on the filter frame to form a "left-hand" or a "right-hand" configuration as established in the foregoing discussion.

Figure 3:
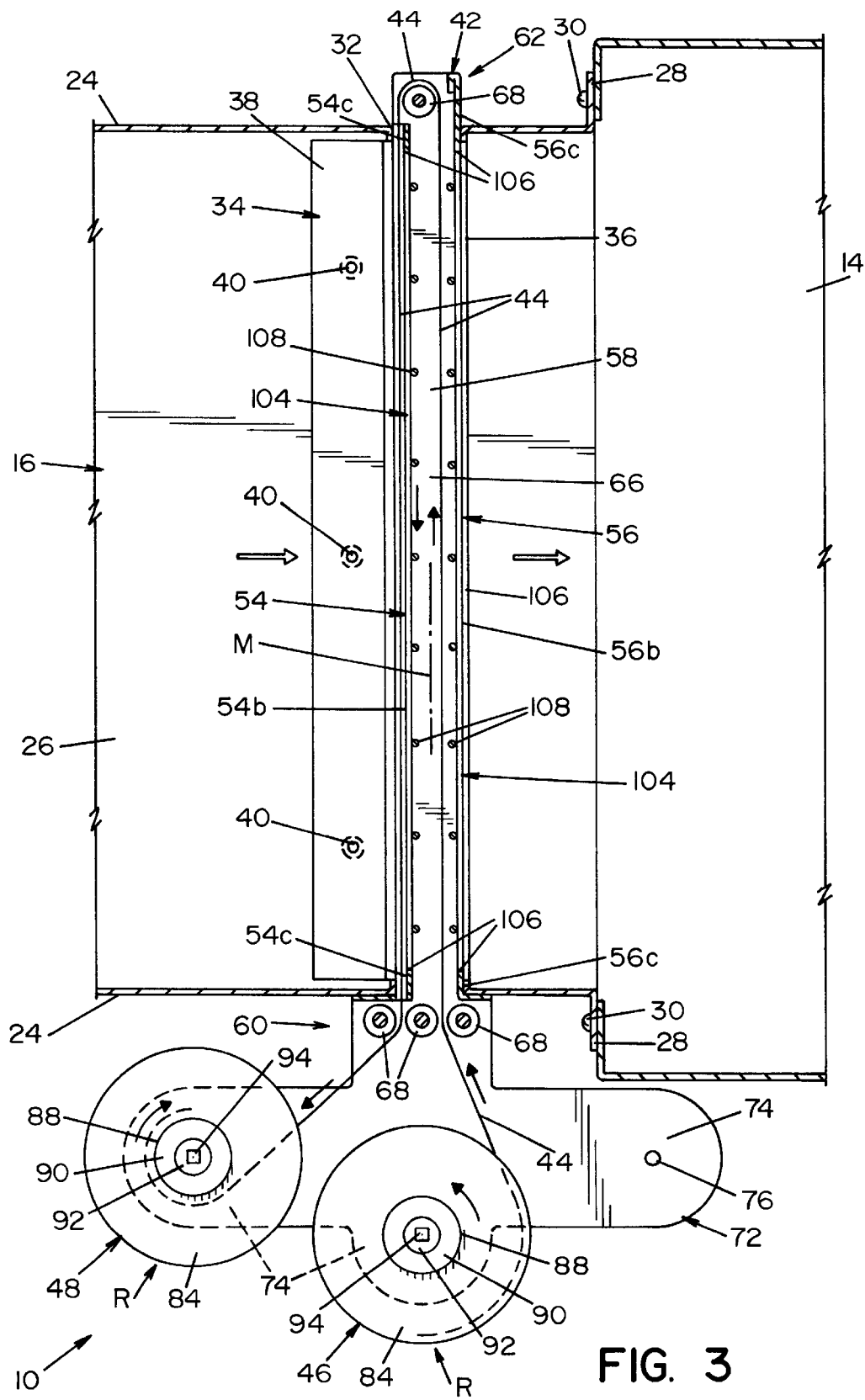
FIG. 3 is a sectional plan view of the furnace filter assembly installed on the furnace shown in FIG. 1.
Figure 4:
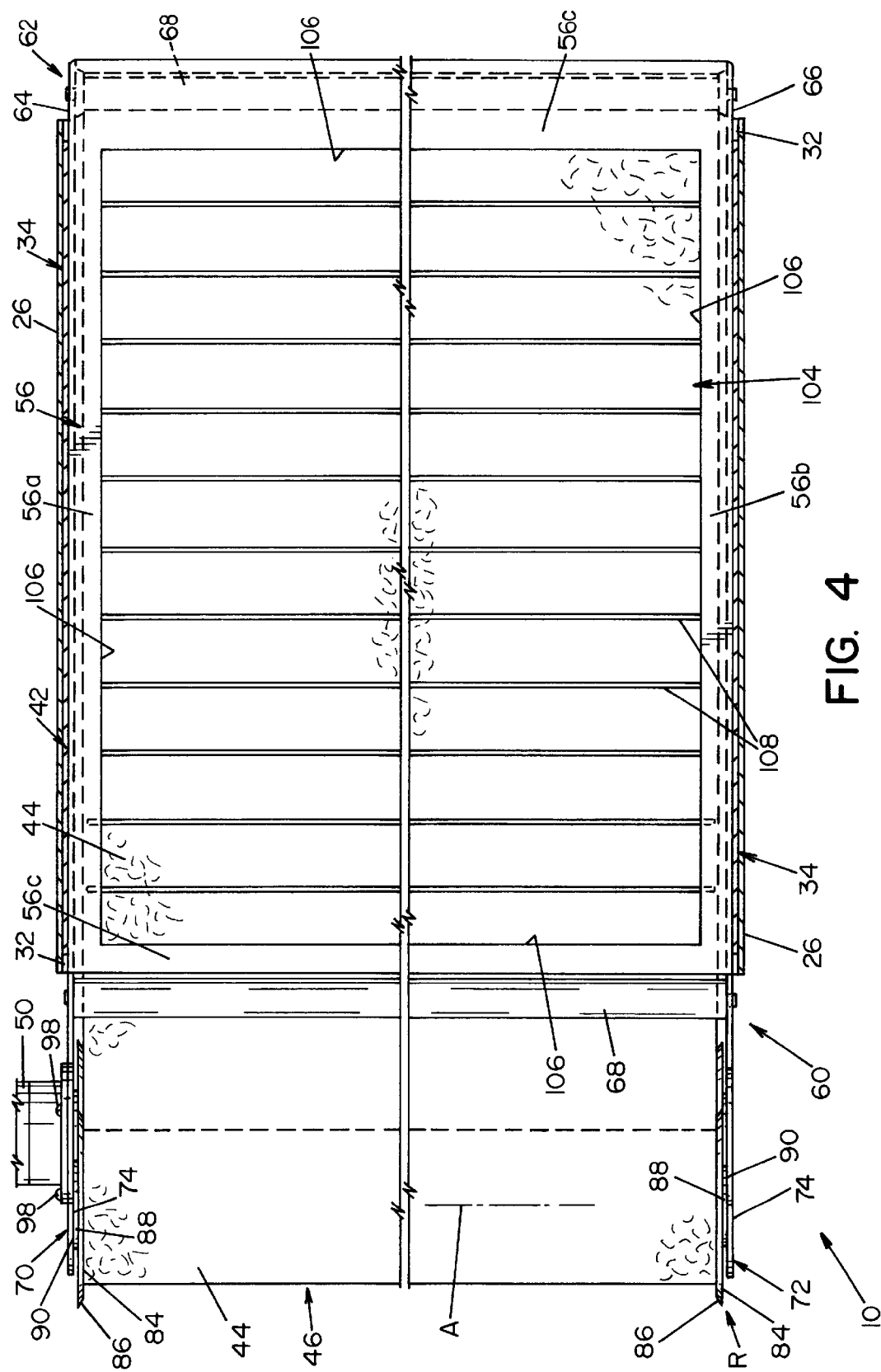
FIG. 4 is a cross-sectional elevation view of the furnace filter assembly taken along line 4—4 in FIG. 2.

As can be best seen in FIGS. 2, 3 and 8, filter media 44 extends from supply roll 46 through and across filter frame 42, and then returns to be progressively wound onto take-up roll 48. At first end 60 of filter frame 42 are a plurality of filter guides 68 in the form of rollers that extend between top wall 64 and bottom wall 66 of filter frame 42 and are rotatably attached thereto. Filter media 44 extends from supply roll 46 between two of the filter guides 68 and into filter passage 58 between front wall 54 and back wall 56 of filter frame 42. Filter media 44 further extends to second end 62 of filter frame 42, and engages a filter guide 68 extending between and rotatably attached to top wall 64 and bottom wall 66. Filter media 44 extends 180° around the latter filter guide 68 and extends back across filter frame 42 upstream of front wall 54. Finally, filter media 44 extends between two of the filter guides 68 at the first end and is wound on take-up roll 48. Front wall 54 and back wall 56 of filter frame 42 each have an opening 104 therein for the passage of air flowing along duct 16. It will be appreciated that filter guides 68 may alternatively be supported between mounting plates 70 and 72 at first end 60, and that additional support plates may be extended from second end 62 to support a filter guide 68. It will be further appreciated that opening 104, shown in FIGS. 1, 4 and 11 as being rectangular and formed by edges 106, may be of any suitable shape or size, and may be comprised of more than one opening in each wall. Extending across opening 104 in each of walls 54 and 56 are a plurality of support wires 108. Support wires 108 are on the downstream side of front wall 54 and on the upstream side of back wall 56, and extend generally vertically between bottom wall 66 and top wall 64 across openings 104.

In accordance with the foregoing discussion, filter media 44 starts as a bulk coil on supply roll 46 and a length thereof extends across filter frame 42, at least once. When installed on furnace 12, filter frame 42 will extend across the interior of intake duct 16. Accordingly, the portion of filter media 44 extending across filter frame 42 will likewise extend across the interior of cold air intake duct 16, and thereby remove dirt and contamination from incoming cold air flowing through the duct. When the portion of filter media 44 that is extending across cold air intake duct 16 becomes clogged and inefficient, filter media 44 is advanced by motor 50, as will be more fully described hereinafter, so that the dirty and clogged portion is progressively wound onto take-up coil 48 and a clean segment of filter media 44 extends across intake duct 16. It will be appreciated that filter media 44 is advanceable from supply roll 46 to take-up roll 48 by energizing motor 50 which in turn provides rotational output through shaft 102. Take-up roll 48 drivingly receives shaft 102 in recess 94 through which the rotational output of motor 50 is transmitted to take-up roll 48 for advancing filter media 44. This procedure is repeated until the bulk coil of filter media 44 is exhausted from supply roll 46. At this time, filter frame 42 is removed from the furnace duct, the used coil of filter media 44 is removed from take-up roll 48 and discarded, and a new bulk coil of filter media 44 is installed on supply roll 46 and extended across filter frame 42 as discussed above to the take-up roll which is provided by the spent supply roll. The filter frame is then replaced in the duct. In connection with removing and replacing or remounting the supply and take-up rolls, it will be appreciated that the top and bottom roll mounting plates at each end of the filter frame can be flexed axially away from one another to release a roll from therebetween and to facilitate introducing a roll therebetween.

Figure 10:
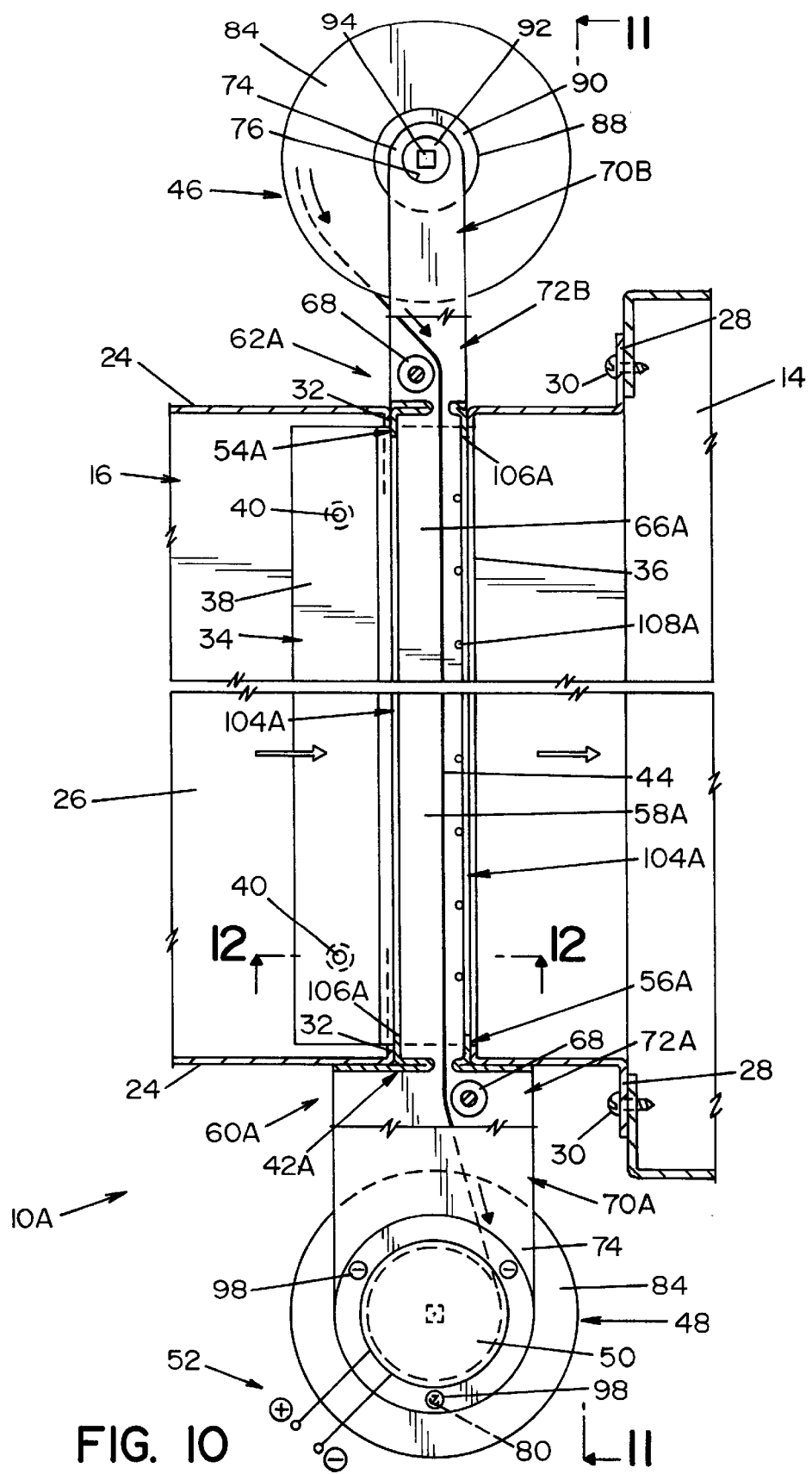
FIG. 10 is a plan view of another embodiment of a furnace filter assembly installed on a furnace in accordance with the present invention.
Figure 11:
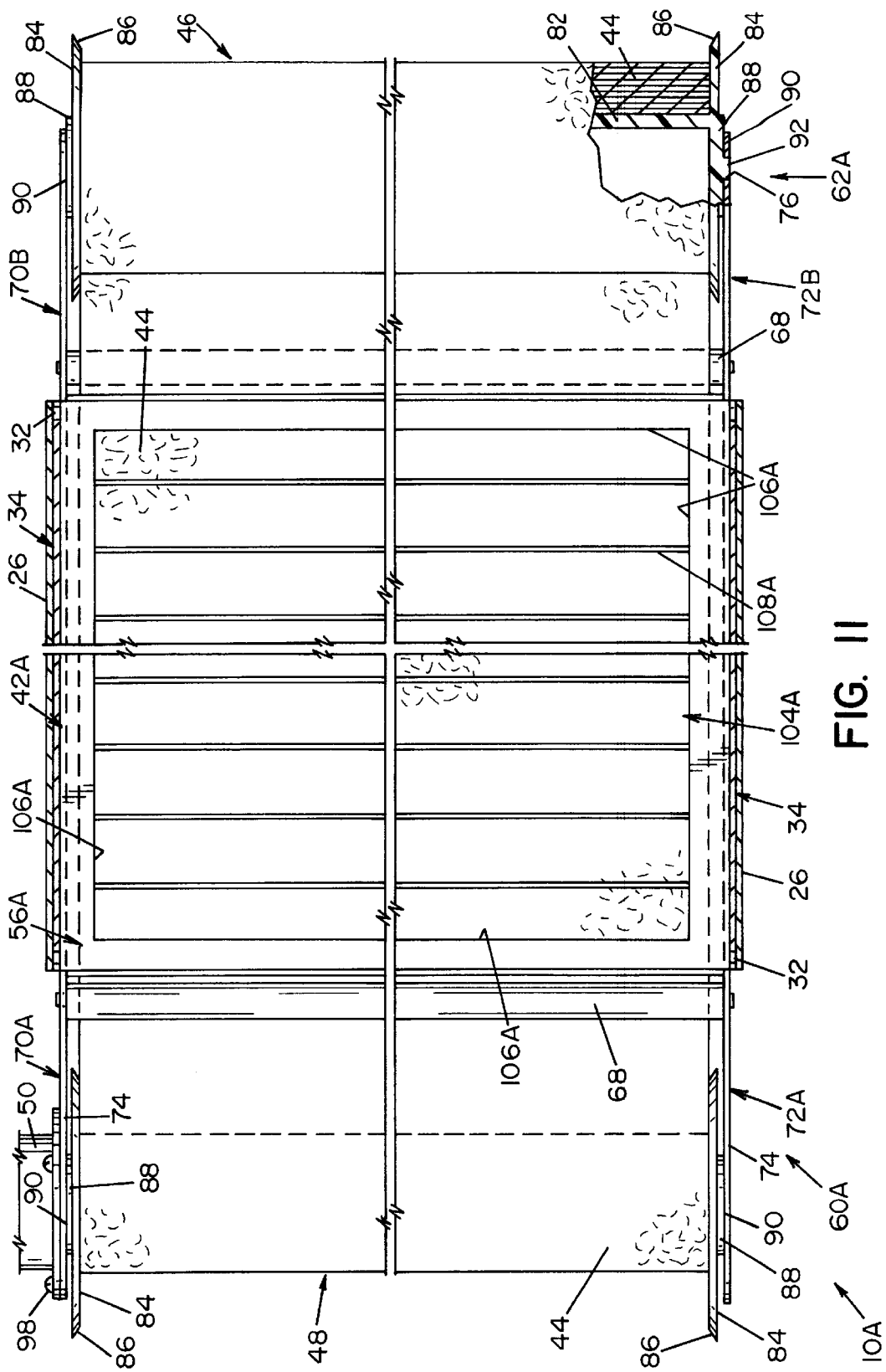
FIG. 11 is a sectional elevation view of the furnace filter assembly taken along line 11—11 in FIG. 10.
Figure 12:
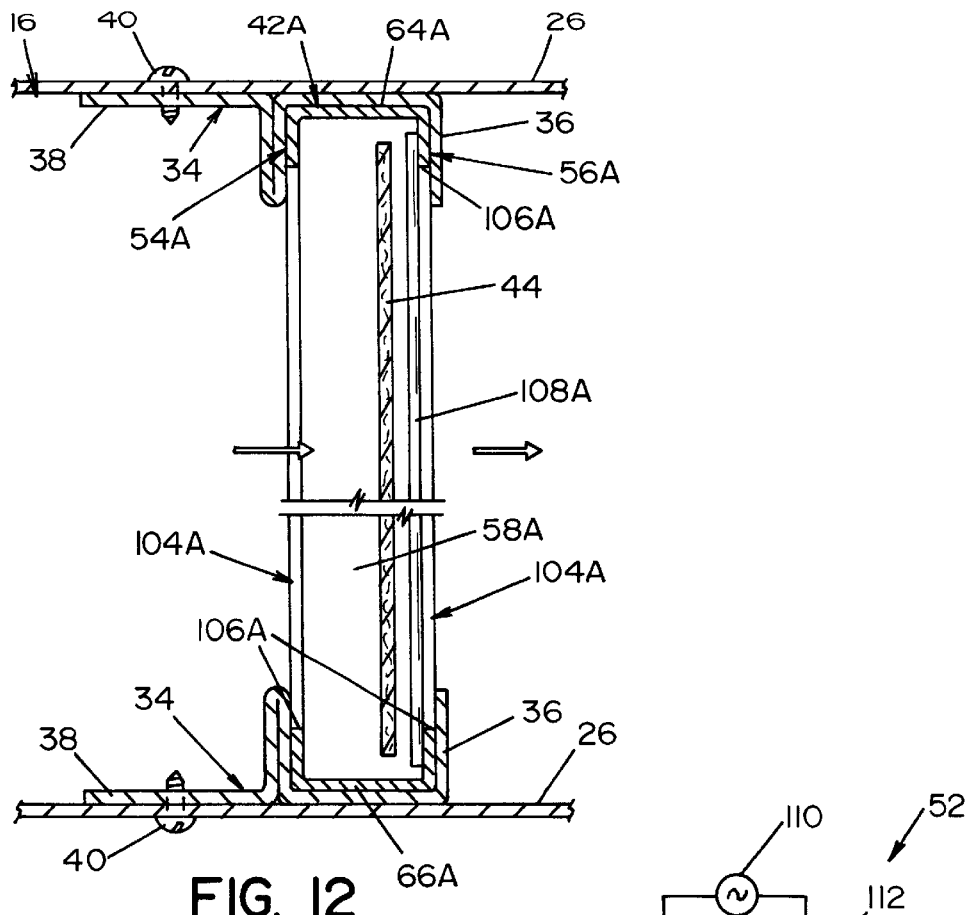
FIG. 12 is a cross-sectional elevation view of the furnace filter assembly taken along line 12—12 in FIG. 10; and, FIG. 13 is a schematic diagram of a preferred embodiment of the control system of a furnace filter assembly in accordance with the present invention.

In the embodiment of furnace filter assembly 10A in FIGS. 10–12, reference characters A and B are associated with some of the item numbers to differentiate between structures of this and the foregoing embodiment. Assembly 10A is comprised of a filter frame 42A, filter media 44, a supply roll 46, a take-up roll 48, a motor 50, and a control system 52 as established in the foregoing discussion. As has been previously described in connection with filter frame 42, filter frame 42A has a front wall 54A and a back wall 56A spaced downstream from front wall 54A defining a filter passage 58A therebetween. Both front wall 54A and back wall 56A have an opening 104A formed by edges 106A. In this embodiment, support wires 108A extend between bottom wall 66A and top wall 64A on the upstream side and across opening 104A of back wall 56A. Integral with top wall 64A and bottom wall 66A at first end 60A are top take-up roll mounting plate 72A and bottom take-up roll mounting plate 72A. Integral with, respectively, top wall 64A and bottom wall 66A at second end 62A of filter frame 42A are top supply roll mounting plate 70B and bottom supply roll mounting plate 72B. Plate 70A has one roll mounting area 74 that includes one roll mounting hole 76, and a motor mounting area 78 coaxial with roll mounting area 74 and including a plurality of motor mounting holes 80. Plate 72A also has a mounting area 74 and a mounting hole 76, and plate 72A is aligned with plate 70A such that roll mounting holes 76 therein are coaxial. Accordingly, take-up roll 48 is installed on filter frame 42A between plates 70A and 72A such that bearing surfaces 90 of take-up roll 48 are adjacent plates 70A and 72A, and stub shafts 92 of take-up roll 48 are coaxially received in and radially supported by holes 76 of plates 70A and 72A. Additionally, take-up roll 48 is installed such that drive recess 94 in one of shafts 92 is adjacent mounting plate 70A. Supported on plate 70A is motor 50 which is positioned adjacent mounting area 78 such that output shaft 102 extending therefrom driveably engages recess 94 in stub shaft 92 of take-up roll 48. As can be best seen in FIGS. 10 and 12, filter media 44 extends from supply roll 46 at second end 62A of filter frame 42A into and along filter passage 58A toward first end 60A to take-up roll 48 upon which filter media 44 can be received. As filter media 44 enters and exits filter passage 58A, at the second and first ends respectively, filter media 44 is supported and guided by a filter guide 68 at each end extending between and rotatably supported by mounting plates 70A and 72A at the second end and mounting plates 70B and 72B, at the first end. It is to be noted in this embodiment that the roll support plates 70A and 70B have a width slightly less than that of duct slots 32 and tracks 34. This provides for the filter assembly to be removable from the duct be axially flexing plates 70A and 70B away from one another, removing supply roll 46 from therebetween and then sliding frame 42 out of the duct. The filter assembly is remounted on the duct by reversing the removal procedure.

Figure 13:
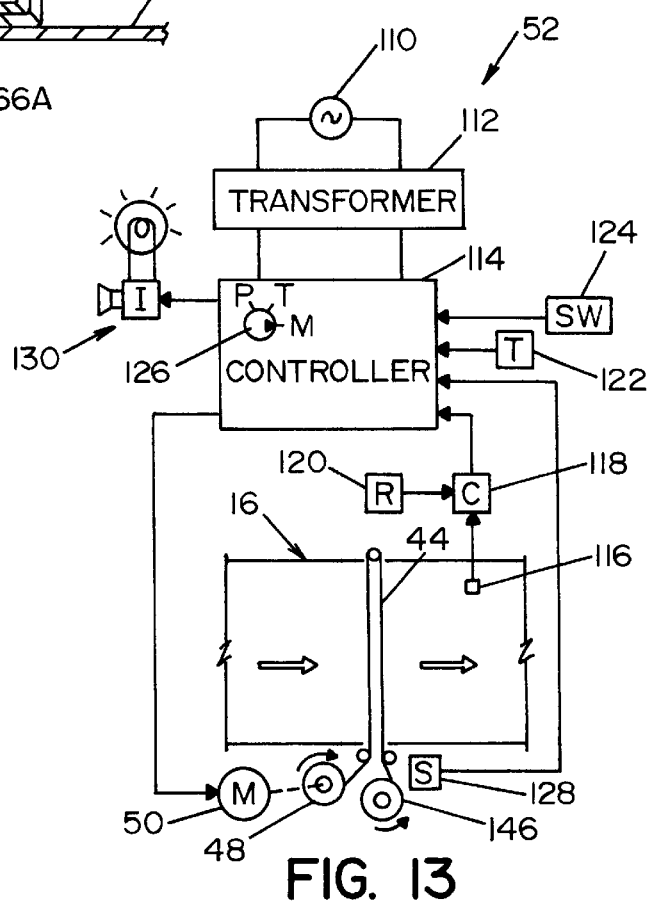

As will be appreciated from FIG. 13, control system 52 for controlling the advancement of filter media from supply roll 46 is operated off of a standard household power supply 110, preferably through a transformer 112. The control system includes a controller 114, such as a microprocessor, for controlling the operation of motor 50 to advance filter media 44 either manually, automatically in response to a predetermined time lapse, or automatically in response to the sensing of a condition indicative of the need for clean filter material in the furnace duct. Further, the control system is preferably operable to output a signal indicative of the status of the quantity of clean filter media available. For these purposes, the control system includes a pressure sensor 116 positioned in duct 16 to sense the air pressure therein at a point downstream of filter frame 42 and thus filter media 44. As filter media 44 becomes clogged, and therefore inefficient, the air pressure immediately downstream of the frame assembly will drop, causing pressure sensor 116 to output a voltage signal proportional to the downstream pressure. Using a comparator 118, the output signal from pressure sensor 116 is compared with a reference signal from a source 120 and, upon a predetermined difference in signals indicative of a dirty filter condition, the comparator outputs a control signal to controller 114 which responds by energizing motor 50 for a time necessary to advance a length of filter media 44 from the supply roll to replace the dirty length in the duct. Control system 52 also includes a timer 122 and a manual switch 124. At selectable time increments, timer 122 signals controller 114 to energize motor 50 and thereby advance the filter media 44. Switch 124 provides the ability to signal the controller to energize motor 50 on an as needed basis, providing the ability to advance the filter media 44 as use dictates. Controller 114 includes a selector switch 126 by which the system can be operated, selectively either manually, or based on time, or pressure as respectively indicated by the letters M, T and P in FIG. 13.

Control system 52 also monitors the quantity of clean filter media 44 remaining on supply roll 46 and issues a warning signal when the supply reaches a predetermined low level. More particularly, a supply sensor 128 monitors the level of filter media 44 remaining and communicates with the controller 114 when the predetermined low level is reached. Upon receiving the signal from the supply sensor 128, the controller energizes indicator 130 which then issues an audible and/or visual signal.

While considerable emphasis has been placed herein on the structures and structural interrelationships between the component parts of the embodiment disclosed, it will be appreciated that other embodiments of the invention can be made and that many changes can be made in the embodiment illustrated and described without departing from the principles of the invention. Accordingly, it is to be distinctly understood that the foregoing descriptive matter is to be interrupted merely as illustrative of the present invention and not as a limitation.

Having thus described the invention, it is so claimed:

1. A furnace filter assembly comprising:
   a filter frame having a top, a bottom, a front, a back, a first end, and a second end;
   a supply roll having top and bottom ends on said filter frame for supporting filter media;
   a top supply roll end plate and a bottom supply roll end plate extending radially outwardly at said top and bottom ends of said supply roll, respectively;
   a take-up roll with top and bottom ends on said filter frame for receiving filter media from said supply roll;
   a top take-up roll end plate and a bottom take-up roll end plate extending radially outwardly at said top and bottom ends of said take-up roll, respectively;
   filter media on said supply roll extending from said supply roll and through said filter frame between said front and said back to said take-up roll;
   a motor on said frame driveably connected to said take-up roll for advancing said filter media from said supply roll to said take-up roll; and
   a top roll mounting assembly and a bottom roll mounting assembly at said top and said bottom of said filter frame, respectively, at said first end, said supply roll being rotatably supported on said filter frame between said top roll mounting assembly and said bottom roll mounting assembly at said first end.

2. The furnace filter assembly of claim 1 wherein each of said top and bottom roll mounting assemblies comprises a top and bottom roll mounting plate, respectively, said mounting plates being adapted to flex away from each other for mounting said supply roll on said filter frame.

3. The furnace filter assembly of claim 1 wherein each of said end plates includes a cylindrical hub having an axis, a bearing boss coaxial with said hub, and a cylindrical stub shaft extending coaxially from said bearing boss.

4. The furnace filter assembly of claim 3 wherein each of said top and bottom roll mounting plates has at least two roll mounting areas for receiving said stub shafts and rotatably supporting said supply roll, each of said mounting areas having an axis, and said mounting plates being disposed at said first end such that said axes of said mounting areas of said top roll mounting plate are coaxial with said axes of said mounting areas of said bottom roll mounting plate.

5. The furnace filter assembly of claim 4 further comprising a second top roll mounting assembly and a second bottom roll mounting assembly at said top and said bottom of said filter frame, respectively, at said second end, said take-up roll being rotatably supported on said filter frame between said second top roll mounting plate and said second bottom roll mounting plate at said second end.

6. The furnace filter assembly of claim 5 wherein each of said second top and bottom roll mounting assemblies comprises a second top roll mounting plate and a second bottom roll mounting plate, respectively, each of said second top and bottom roll mounting plates having at least two roll mounting areas for receiving said stub shafts and rotatably supporting said supply roll, each of said mounting areas having an axis, and said mounting plates being disposed at said first end such that said axes of said mounting areas of said top roll mounting plate are coaxial with said axes of said mounting areas of said bottom roll mounting plate.

7. The furnace filter assembly of claim 1 wherein said filter frame includes a plurality of filter media guides, said guides extending between said bottom and said top of said filter frame, one of said plurality of filter guides being supported on said filter frame at said first end, and another of said plurality of filter guides being supported on said filter frame at said second end.

8. The furnace filter assembly of claim 1 wherein said take-up roll is rotatably supported on said filter frame between said top roll mounting assembly and said bottom roll mounting assembly at said first end.

9. The furnace filter assembly of claim 8 wherein said filter frame includes a plurality of filter media guides, said plurality of filter guides extending between said bottom and said top of said filter frame, one of said plurality of filter guides being attached to said filter frame at said second end, said filter media on said supply roll extending from said supply roll through said filter frame along one of said back and front and about said one of said plurality of filter guides at said second end of said filter frame, and then through said filter frame along the other of said back and said front to said take-up roll.

10. The furnace filter assembly of claim 8 wherein each of said top and said bottom roll mounting assemblies comprises a top and bottom roll mounting plate, respectively, having at least two mounting areas for rotatably supporting said supply roll and said take-up roll, each of said mounting areas of each of said mounting plates having an axis, and said mounting plates being disposed at said first end such that the axes of said mounting areas of said top roll mounting plate are coaxial with said mounting areas of said bottom roll mounting plate.

11. The furnace filter assembly of claim 1 further comprising an electrical control system for controlling said motor.

12. The furnace filter assembly of claim 11 further comprising a second top roll mounting assembly and a second bottom roll mounting assembly at said top and said bottom of said filter frame, respectively, at said second end, said take-up roll being rotatably supported on said filter frame between said second top roll mounting assembly and said second bottom roll mounting assembly at said second end.

13. The furnace filter assembly of claim 11 wherein said filter frame includes a plurality of filter media guides, said guides extending between said bottom and said top of said filter frame, one of said plurality of filter guides being supported on said filter frame at said first end thereof, and another of said plurality of filter guides being supported on said filter frame at said second end thereof.

14. The furnace filter assembly of claim 11 wherein said electrical control system includes:
a power supply for driving said motor;
signal generator means for providing a motor control signal; and,
a controller responsive to said signal from said signal generator means for connecting said motor to said power supply for advancing said filter media.

15. The furnace filter assembly of claim 14 wherein said control system further includes an indicator for indicating the quantity of filter media on said supply roll of said filter assembly.

16. The furnace filter assembly of claim 15 wherein said signal generator means includes a manual switch, a timer, and a differential pressure sensor.

17. The furnace filter assembly of claim 16 wherein the controller includes selector means for selecting one of said switch, timer and pressure sensor.

18. The furnace filter assembly of claim 11 wherein said take-up roll is rotatably mounted on said filter frame at said first end.

19. The furnace filter assembly of claim 18 wherein said filter frame includes a plurality of filter media guides, said plurality of filter guides extending between said bottom and said top of said filter frame, one of said plurality of filter guides being attached to said filter frame at said second end, said filter media on said supply roll extending from said supply roll through said filter frame along one of said back and front and about said one of said plurality of filter guides at said second end of said filter frame, and then through said filter frame along the other of said back and said front to said take-up roll.

20. The furnace filter assembly of claim 19 wherein each of said top and bottom roll mounting assemblies comprises a top and bottom roll mounting plate, respectively, having at least two mounting areas for rotatably supporting said supply roll and said take-up roll, each of said mounting areas of each of said mounting plates having an axis, and said mounting plates being disposed at said first end such that said axes of said mounting areas of said top roll mounting plate are coaxial with said mounting areas of said bottom roll mounting plate.

21. The furnace filter assembly of claim 20 wherein said electrical control system includes:
a power supply for driving said motor;
signal generator means for providing a motor control signal; and,
a controller responsive to said signal from said signal generator means for connecting said motor to said power supply for advancing said filter media.

22. A furnace filter kit for installation on an existing furnace comprising:
a filter frame having a front, a back, a top, a bottom, a first end, and a second end;
a supply roll with top and bottom ends for supporting a length of filter media;
a first top roll end plate and a first bottom roll end plate extending radially outwardly at said top and bottom ends of said supply roll, respectively;
a take-up roll with top and bottom ends for receiving said filter media;
a second top roll end plate and a second bottom roll end plate extending radially outwardly at said top and bottom ends of said take-up roll, respectively;
a motor driveably connected to said take-up roll; and
a top roll mounting plate and a bottom roll mounting plate extending outwardly of said top and said bottom of said filter frame, respectively, at one of said first end and said second end.

23. The furnace filter kit of claim 22 wherein said top and said bottom roll mounting plates extend from said first end of said filter frame, and each of said plates has at least two roll mounting areas for rotatably supporting said supply roll and said take-up roll.

24. The furnace filter kit of claim 22 further comprising a second top-roll mounting plate and a second bottom roll mounting plate extending outwardly of said top and bottom of said filter frame, respectively, at the other of said first end and said second end.

25. The furnace filter kit of claim 22 further comprising an electrical control system.

26. The furnace filter kit of claim 25 wherein said electrical control system includes:
- a power supply for driving said motor;
- signal generator means for providing a motor control signal; and
- a controller responsive to said signal from said signal generator means for connecting said motor to said power supply.

27. The furnace filter kit of claim 26 wherein said control system further includes an indicator for indicating the quantity of filter media on said supply roll.

28. The furnace filter assembly of claim 27 wherein said signal generator means includes a manual switch, a timer, and a differential pressure sensor.

29. The furnace filter assembly of claim 28 wherein said controller includes selector means for selecting one of said switch, timer and pressure sensor.

30. A furnace filter assembly for use on a furnace having an air intake duct with a top wall, a bottom wall, and a pair of spaced apart side walls extending therebetween, said side walls having opposing slots extending between said top wall and said bottom wall, said furnace filter assembly comprising:
- a filter frame having a front, a back, a top, a bottom, a first end and a second end, said filter frame being receivable in the slots of a furnace duct for said top of said filter frame to be adjacent the top wall of the duct, said bottom of said filter frame to be adjacent the bottom wall of the duct, and for each of the first and second ends to be outwardly adjacent a different one of the slots in the duct;
- a supply roll having a top, a bottom, and an end plate at each of said top and said bottom of said supply roll, each of said supply roll end plates including a cylindrical hub having an axis, a bearing boss coaxial with said hub, and a cylindrical stub shaft extending coaxially from said bearing boss, said supply roll being rotatably supported on one end of said frame for supporting a supply of filter media;
- a take-up roll having a top, a bottom, and an end plate on each of said top and said bottom of said take-up roll, each of said take-up roll end plates including a cylindrical hub with an axis, a bearing boss coaxial with said hub, and a cylindrical stub shaft extending coaxially from said bearing boss, said take-up roll being rotatably supported on one end of said frame for receiving filter media from said supply roll;
- filter media extending from said supply roll through said filter frame between said front and said back to said take-up roll;
- a motor driveably connected to said take-up roll;
- an electrical control system having a power supply for driving said motor, signal generator means for providing a motor control signal, and a controller responsive to said control signal connecting said motor to said power supply for advancing said filter media;
- a top roll mounting plate and a bottom roll mounting plate on said top and said bottom of said filter frame, respectively, at said first end for mounting said supply roll to said filter frame;
- said top and bottom roll mounting plates being adapted to flex axially away from each other to release one of said rolls therebetween and to facilitate mounting one of said rolls therebetween.

31. The furnace filter assembly of claim 30 wherein each of said mounting plates at said first end has at least two roll mounting areas for receiving said stub shafts and rotatably supporting said supply roll, each of said mounting areas having an axis, and said mounting plates being disposed at said first end such that said axes of said mounting areas of said top roll mounting plate are coaxial with said axes of said mounting areas of said bottom roll mounting plate.

32. The furnace filter assembly of claim 31 wherein said motor has an output shaft and at least one of said stub shafts of each of said rolls has a non-circular drive recess for driveably engaging with said output shaft of said motor.

33. The furnace filter assembly of claim 30 wherein said filter frame supports a second top roll mounting plate and a second bottom roll mounting plate on said top and said bottom, respectively, at said second end for mounting said take-up roll to said filter frame, each of said second top and bottom roll mounting plates having at least one roll mounting area for rotatably supporting said take-up roll, each of said mounting areas of each of said mounting plates having an axis, and said first top and bottom roll mounting plates being disposed at said first end and said second top and bottom roll mounting plates being disposed at said second end such that said axes of said mounting areas of said respective top mounting plates are coaxial with said axes of said mounting areas of said respective bottom mounting plates.

34. The furnace filter assembly of claim 30 wherein said second top and bottom roll mounting plates are adapted to flex away from each other for mounting said take-up roll on said filter assembly.

35. The furnace filter assembly of claim 30 wherein said filter frame further includes filter support means in an opening in one of said front and said back.

36. The furnace filter assembly of claim 35 wherein said filter support means comprises a plurality of filter support wires across an opening in one of said front and said back.

37. The furnace filter assembly of claim 30 wherein said generator means includes a manual switch, a timer, and a differential pressure sensor.

38. A method of installing a furnace filter assembly having at least two flexible roll mounting plates on an existing furnace intake duct having opposing duct walls and slots in the duct walls, comprising the steps of:
- mounting a supply roll having end plates on the top and bottom ends and a length of filter media wound thereon between two of said mounting plates on said filter frame;
- feeding said filter media from said supply roll, through said filter frame, and to a take-up roll having end plates on the top and bottom ends;
- inserting said filter frame with said supply roll, take-up roll, and said filter media into said slots in the furnace intake duct; and
- connecting an electrical control system for said assembly to a power supply.

* * * * *